Feb. 20, 1962    J. D. WATTS    3,021,974
FLUID SEALING ARRANGEMENT
Filed Aug. 1, 1958    3 Sheets-Sheet 1
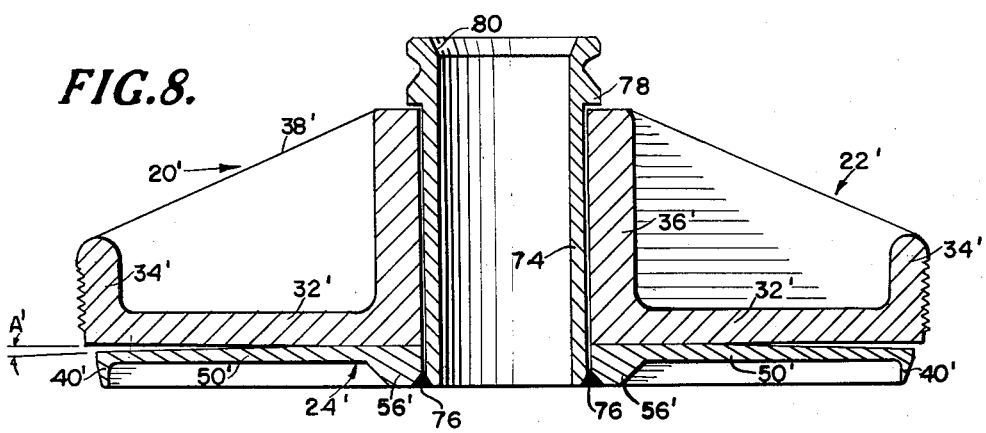
FIG. 8.
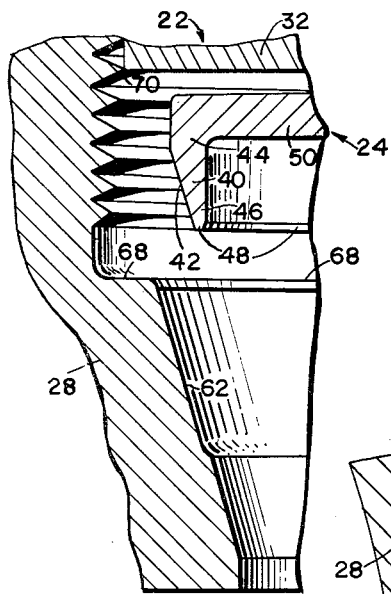
FIG. 5.
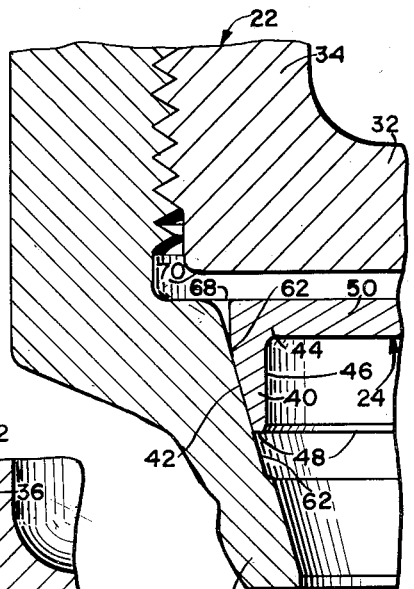
FIG. 6.
FIG. 7.
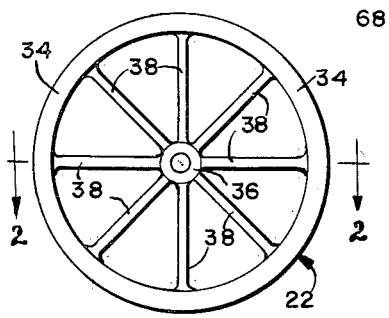
FIG. 1.
INVENTOR
JOHN D. WATTS
BY Cushman, Darby & Cushman
ATTORNEYS

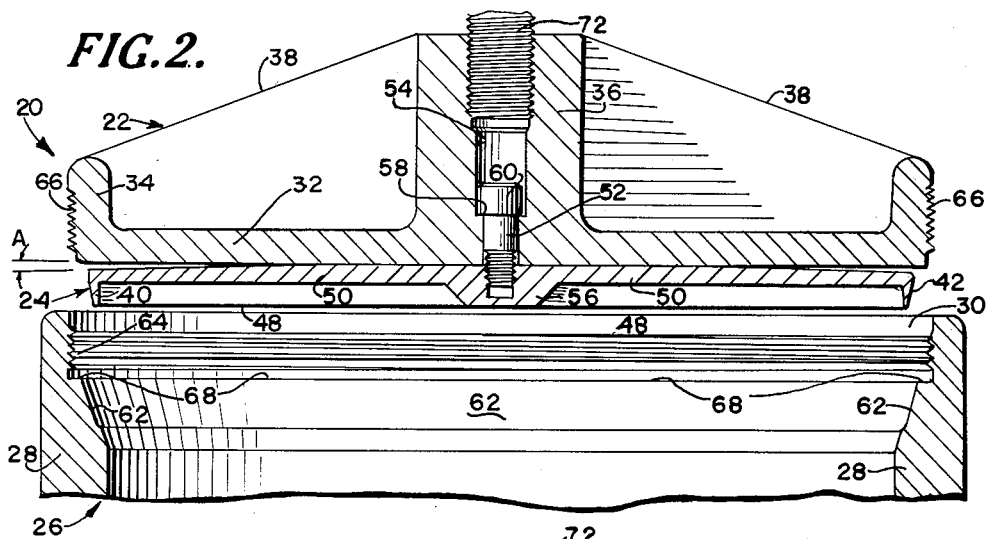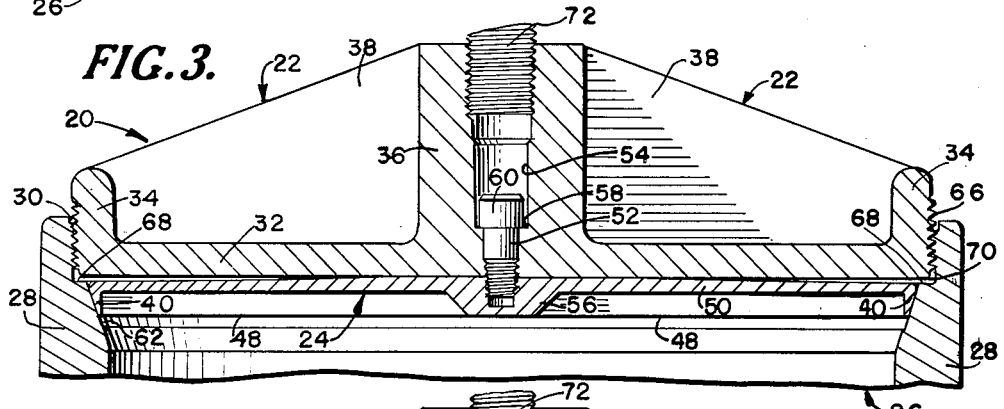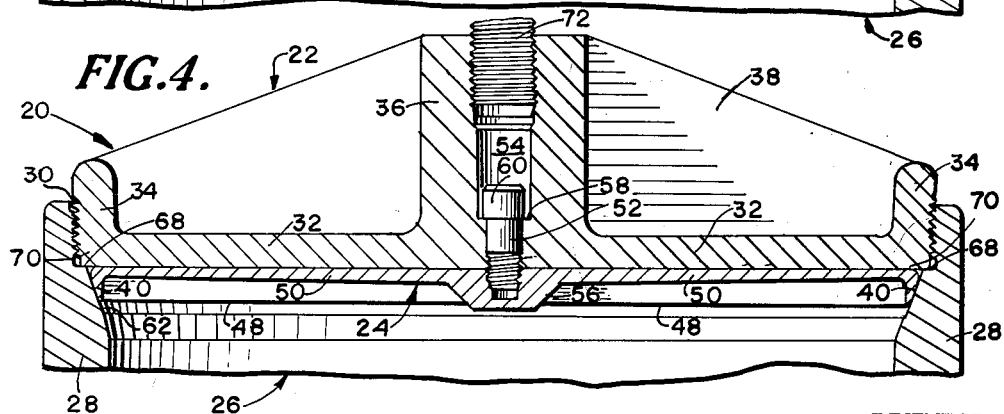

Feb. 20, 1962

J. D. WATTS 3,021,974

FLUID SEALING ARRANGEMENT

Filed Aug. 1, 1958

INVENTOR
JOHN D. WATTS

BY
Cushman, Darby & Cushman
ATTORNEYS

United States Patent Office 3,021,974
Patented Feb. 20, 1962

3,021,974
FLUID SEALING ARRANGEMENT
John D. Watts, Houston, Tex., assignor to Gray Tool Company, Houston, Tex., a corporation of Texas
Filed Aug. 1, 1958, Ser. No. 752,639
8 Claims. (Cl. 220—46)

This invention relates to fluid sealing arrangements and in particular to arrangements for closing and sealing an opening in a hollow member such as a pressure vessel.

An important object of the present invention is to provide a novel sealing means for openings in hollow members. A somewhat related object resides in the provision of an improved, combined seal and closure construction particularly adapted to be utilized for closing an opening in a pressure vessel or the like and for effecting a fluid-tight seal capable of withstanding high pressures and/or temperatures.

It is a further object of the invention to provide a fluid sealing arrangement in combination with the open end of a pressure vessel or the like and involving an annular joint formed by a sealing element and an annular seat adjacent the open end of a vessel wherein energy is stored in the sealing element in a unique manner to insure a completely fluid-tight joint. It is contemplated in one embodiment of my invention, to be hereinafter described in detail, that the sealing element include a generally disc-like portion and be of rigid, unitary construction but having some elastic properties, with a circumferential sealing surface formed on a circumferential lip depending from the disc-like portion and adapted to be engaged to a complementary annular seat in an opening in the vessel. For the purpose of creating energy within the sealing element, it is so designed that the circumferential sealing surface on its lip will initially contact or be engaged to the annular seat in the opening in the pressure vessel, after which the central portion of the sealing element will be deflected in such a manner and by such means, as will be explained more fully hereinbelow, as to tend to cause the circumferential lip to move radially outwardly against its restraining annular seat. Such radially outward movement of the circumferential lip is prevented by the annular seat, and hence, energy will be stored in the sealing member whereby a constant and continuous force is exerted on the sealing surfaces to assure fluid-tight contact.

More specifically, it is contemplated in one embodiment that the circumferential or annular lip on the sealing element be generally axially directed, and have an outer tapering surface defining the circumferential sealing surface, with the disc-like portion of the sealing element inclining slightly away from the base of the lip toward the center of said portion. Further, it is also proposed that a closure cap be operatively engaged to the open end of the pressure vessel and to the disc-like portion of the sealing element to effect a deflection of such portion away from and inwardly of the open end of the vessel. The annular seat for the sealing element in the open end of the pressure vessel preferably is formed of a rigid material, such as metal or the like.

An additional object of the invention resides in the provision of a novel seal for pressure vessels and the like and eliminating the necessity of utilizing conventional compressible materials, such as rubber or the like, whereby the sealing joint may be constructed entirely of rigid materials, such as metals including stainless steel and other alloys, to provide a joint particularly suitable to withstand extremely high pressures and/or temperatures without leakage and also to resist corrosive or harmful effects of chemicals or other liquids.

Yet another object is to provide an effective sealing arrangement involving only rigid materials, such as metals, for closing pressure vessels or the like and characterized by being adapted to be conveniently and readily placed in or removed from operative position without any progressive bearing failures, or without any scraping, abrading or galling action taking place between the engaged surfaces defining the joints.

Further objects and advantages of the invention will be in part obvious and in part pointed out hereinafter.

The novel features of the invention may be best made clear from the following description and accompanying drawings in which:

FIGURE 1 is a top plan view of a closure cap of the invention;

FIGURE 2 is an enlarged vertical sectional view of the closure cap of FIGURE 1, taken generally along line 2—2 thereof, and also showing in vertical section a sealing element of the invention operatively connected to the cap and in a position about to be assembled in an opening in a pressure vessel, the latter being shown fragmentarily;

FIGURE 3 is a view corresponding to FIGURE 2 and showing the closure cap and sealing element mounted within the opening in the vessel and just prior to being tightened into final position;

FIGURE 4 is a view corresponding to FIGURE 3 and showing the closure cap and sealing element in their final assembled position in the opening in the pressure vessel;

FIGURE 5 is a still further enlarged and fragmentary vertical sectional view of an outer or circumferential portion of the sealing element just prior to being positioned in an annular seat in the pressure vessel opening;

FIGURE 6 is a view corresponding to FIGURE 5 and showing the sealing element in surface engagement with its seat, as indicated in FIGURE 3;

FIGURE 7 is a view corresponding to FIGURE 5 and showing the sealing element in its final position in the opening in the pressure vessel, as indicated in FIGURE 4;

FIGURE 8 is a modification of the closure cap and sealing member arrangement;

Figure 9:
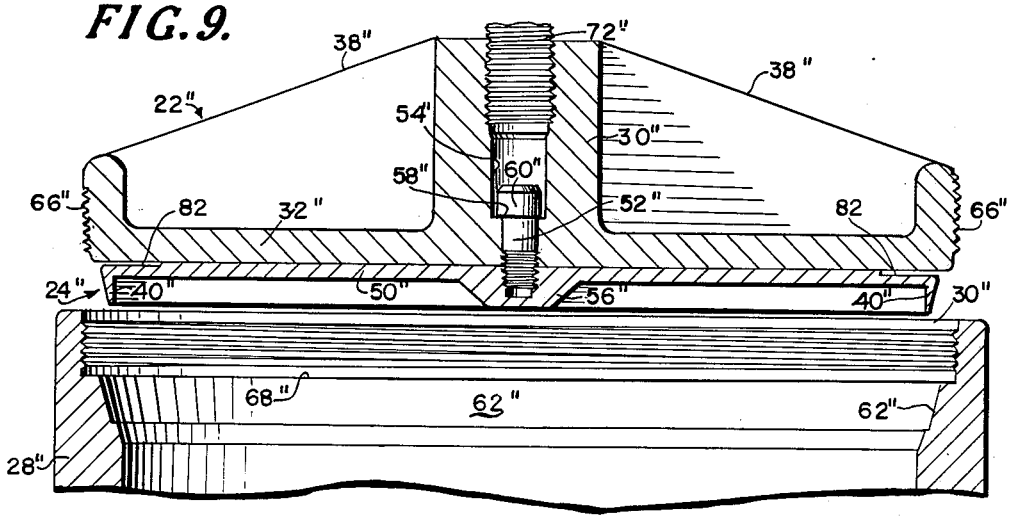
FIGURE 9 is a view corresponding to FIGURE 2 and showing another embodiment of the sealing member.

According to the invention, and as will be brought out in more detail hereinbelow, there is provided in combination with a hollow member, such as a pressure vessel, having an opening therein with an annular seat formed adjacent this opening, a rigid generally disc-like sealing element having a somewhat raised central portion and being formed with a circumferential surface normally of a size and shape substantially complementary to the seat, wherein this element may be arranged so that its circumferential surface engages with the annular seat, with means being provided for effecting a deflection of the central portion of the sealing element so that energy will be stored therein to result in the application of a constant internal pressure or force on the circumferential surface of the sealing element to continuously urge it into complete sealing contact with its seat. It is preferred that the means for effecting such deflection be in the form of a closure cap whereby to constitute with the sealing element a closure arrangement adapted to be conveniently handled, the cap including a base having a flat outer surface and the sealing element being operatively connected to the cap adjacent the base. The circumferential sealing surface on the sealing element is defined by a tapering outer surface on an annular lip depending axially from the periphery of the central portion of the sealing element.

Referring now to the drawings, FIGURES 1–4 illustrate one embodiment of the invention. As there shown, a closure arrangement 20 is provided, including a closure cap 22 and a sealing element 24. It will be appreciated, as the description proceeds, that closure arrangements coming within the scope of my invention may be utilized in combination with various types of hollow members having openings therein which it is desired to close and seal. One specific use is in connection with pressure vessels.

Numeral 26 indicates a hollow member or pressure vessel having an annular portion 28 defining an opening 30.

The cap 22, as shown in FIGURES 1–4, may be formed with a generally disc-like base portion 32 having a substantially flat or level bottom surface, and with an annular, axially directed flange 34 extending upwardly therefrom. The cap 22 is shown as also including a central lug or boss 36 with a plurality of radial webs 38 extending between the lug 36 and flange 34, as best seen in FIGURE 1.

The sealing element 24 is of generally disc-like configuration including an axially directed, annular lip 40 extending in the opposite direction from the flange 34 of the cap 22. This lip 40 is shown as including an outer circumferential surface 42 tapering downwardly and inwardly away from the base or upper end 44 thereof, while the inner circumferential surface 46 of this lip is shown as being of generally cylindrical shape whereby the thickness of the lip decreases in a vertical direction from its base or upper end 44 to its tip or lower end 48, as best seen in FIGURES 5–7.

The central, disc-like portion 50 of the sealing element 24 is shown as inclining or tapering upwardly from the base 44 of the lip 40 toward the flat bottom of the base portion 32 of the cap 22, whereby a small angle A is defined between the top surface of the central portion 50 and the bottom surface of the base 32, as seen in FIGURE 2. By way of example, this angle A may be approximately 1° whereby the central portion 50 of the sealing element is of relatively flat conical configuration wherein the included angle will be close to 180°.

The sealing element 24 may be suitably connected to the cap 22, as by means of a bolt 52 arranged in a bore 54 within the lug 36 and threadedly connected to an enlarged area 56 at the midpoint of the sealing element 24, as shown in FIGURES 2–4. A shoulder 58 is formed within the bore 54 to provide a stop surface for the head 60. The bolt 52 preferably is tightened on the sealing element so that relative rotation between the cap 22 and sealing element 24 will be permitted. A recess or slot may be formed in the top of bolt head 60 to receive an appropriate tool through the bore 54, as will be understood.

The cap 22 and sealing element 24 preferably are both constructed of some suitable hard, strong and rigid material, such as metal, with the base portion 32 of the cap being of a greater thickness than the disc-like portion 50 of the sealing element, for a purpose to become apparent as the description proceeds.

The portion 28 of the vessel is provided with an annular, inwardly tapering seat 62, adjacent the opening 30, the taper angle of the seat 62 preferably being substantially equal to the taper angle of the circumferential surface 42 on the sealing element lip 40. Also shown as being formed adjacent the opening 30 are threads 64 for engagement to a threaded portion 66 on the flange 34 of the cap.

In assembling the closure arrangement 20 in position within the opening 30, the cap is screwed into the opening and the lip 40 on the sealing element enters into surface engagement with the annular seat 62, as indicated in FIGURES 3 and 6. The sealing element 24 is shown coaxially arranged relative to the cap 22 whereby the lip 40 will be automatically seated on the annular seat 62 as the cap is screwed into the opening.

The sealing element is in its normal, undeflected condition when in the position of FIGURES 3 and 6. The cap is screwed down more tightly so that the base 32 thereof presses against the sealing element causing the somewhat raised disc-like portion 50 thereof to be deflected downwardly until the flat bottom of the base 32 is in full and complete engagement with the disc-like portion 50 of the sealing element, as indicated in FIGURES 4 and 7. It should be appreciated that the turning movement of the cap 22 will be effected without a corresponding rotation of the sealing element 24, whereby there will be no relative sliding movement or galling action between the circumferential surfaces 42 of the lip 40 and the seat 62.

This deflection of the disc portion 50 of the sealing element, as is evident, will tend to cause a radially outward movement of the lip 40, but such outward movement is restrained and prevented by the annular seat 62. Hence, energy will be stored within the sealing element and operate to produce a constant pressure or force on the lip 40 urging it outwardly against its seat 62, whereby a mechanically strong, leak-proof joint is formed therebetween.

In order to indicate to the operator when the disc portion 50 of the sealing element has been deflected to the desired extent, the portion 28 of the vessel 26 is shown as being formed with an annular, radial shoulder 68 at the upper end of the seat 62 and for engagement by the peripheral lower corner or edge 70 of the cap 22 when the sealing element 24 has been deflected the proper amount and is in the position indicated in FIGURES 4 and 7. In this connection, it will be noted that the bottom of the base 32 of the cap extends radially outwardly of the sealing element 24.

It will be appreciated that the thick base 32 of the cap will undergo little or no deflection while deflecting the sealing element 24 in the manner described. The thick portion 28 of the vessel 26, which may also be made of metal or other hard material, likewise undergoes little or no expansion when the sealing element 24 is deflected. The deflection of the portion 50 of the sealing element is within its elastic limit whereby the element will return to its original shape when cap 22 is backed off and the closure 20 removed. The thickness of the base 32 of the cap is sufficient to withstand any hydrostatic or other end loads applied thereto.

If desired, the sealing element 24 and the cap 22 may be separate and unconnected, with the sealing element 24 being initially placed so that its lip 40 engages in the seat 62, as indicated in FIGURE 3, after which the closure cap will be taken and screwed into the opening 30 until it deflects the disc portion 50 of the sealing element, as previously described. In addition, the type of detachable connection between the cap 24 and the portion 28 of the vessel may be other than the threaded type shown. For example, radially outwardly directed flanges may be formed on both the portion 28 and the cap with bolts or similar fastening means utilized to clamp these radial flanges together to force the base 32 of the cap downwardly against the sealing element 24 to effect the desired deflection of the latter. With the threaded connection shown, however, it will be understood that any appropriate means, including power actuated means (not shown) may be provided for facilitating the operations of screwing the cap on or off. If desired, the webs 38 may be engaged by the hand or by some suitable tool to effect manipulation of the cap. Furthermore, a handle (not shown) may be provided for the cap with a lower threaded shank 72 screwed into the lug 36, as indicated in FIGURES 2–4 for lifting the cap into or out of position.

FIGURE 8 illustrates a modification of the closure arrangement of FIGURES 1–4 wherein similar reference numerals have been used to designate similar parts. This closure arrangement 20' is substantially identical to the one shown in FIGURES 1–4 except that it includes a conduit connection 74 extending through the lug 36' of the cap 22' and the disc portion 50' of the sealing element 24', as indicated. The conduit 74 is connected to the sealing element 24' by an annular, fluid-tight weld joint 76, as shown. The conduit 74 may be held in the position shown by any suitable means such as the shoulder 78 engaging the top of lug 36' and the weld joint 76 at the bottom of the lug whereby the desired deflection of the disc 50' of the sealing element 24' will be effected essentially in the same manner as that previously described relative to the embodiment of FIGURES 1–4. In this regard, clearances are shown as being provided between conduit 74 and the lug 36' and enlargement 56' of the disc 50', to permit rotation of the cap 22' relative to the element 24', and also so as not to interfere with the deflection of the disc 50'.

The upper end of the conduit 74 is shown as including an upwardly and outwardly tapering internal seat 80 and may be adapted for suitable connection to other conduits by some appropriate sealing and connecting arrangement.

Figure 10:
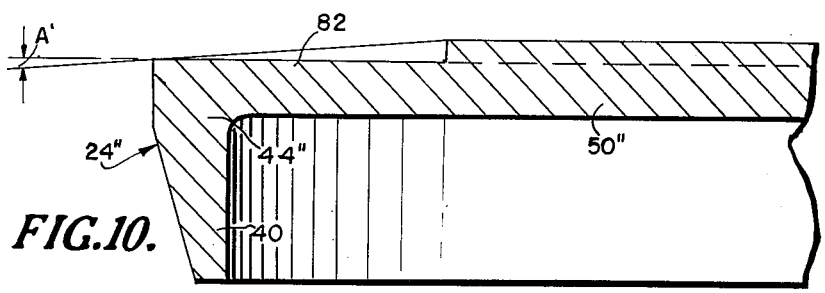
FIGURE 10 is a fragmentary and enlarged sectional view of the sealing member of FIGURE 9.
Figure 11:
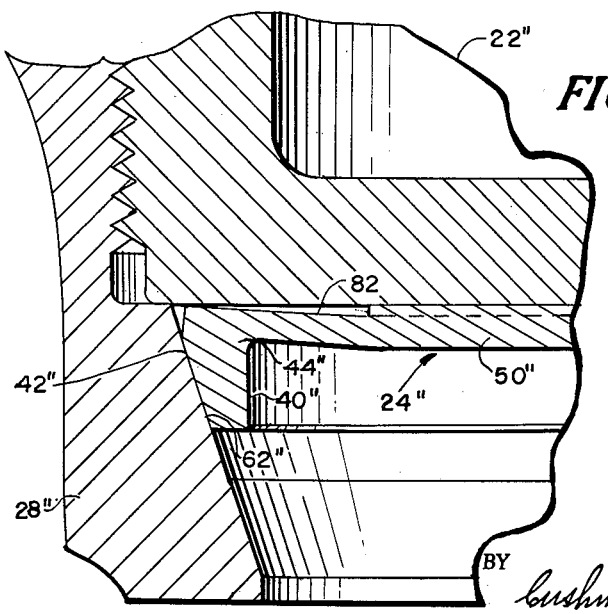
FIGURE 11 is a view corresponding to FIGURE 7 but with the sealing member of FIGURE 9.

FIGURES 9–11 illustrate another embodiment of the sealing element 24 shown in FIGURES 1–7. Similar reference numerals have again been used to designate similar parts. The sealing element 24" of FIGURES 9–11 is substantially identical to element 24, except that it is formed with an annular, peripheral faced-off or cut-out area 82 with the remainder of the disc-like portion 50" being substantially level, as shown. Hence, in this embodiment, the thicker part of disc 50" constitutes the somewhat raised central portion of the sealing element.

An angle A' of approximately 1° is defined by the faced-off area 82 in the manner indicated in FIGURE 10. And the portion 50" at this area 82 will be bent or deflected about the base 44" of the lip 40", for example, as indicated in FIGURE 11, when the closure 22" is tightened into its final position whereby energy will be stored in the sealing element as previously described.

It will be evident from the foregoing that the invention provides a mechanically strong, leak-proof closure for pressure vessels and the like, capable of withstanding exceedingly high internal pressures, for example, of the order of 10,000 p.s.i. or higher. Furthermore, inasmuch as the seal between the sealing element 24 and the seat 62 is made without involving any relative movement or rotation therebetween, this structure is of considerable value where stainless steels are used and galling or scraping must be avoided, and it permits a closure of large diameter to be readily made up with minimum torque requirements.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:
1. In combination with a hollow member having an opening therein and an annular seat formed inwardly of said opening, a fluid tight sealing arrangement for said opening comprising: a sealing element including a disc-like portion and a circumferential lip having an outer surface complementary to said seat, said disc-like portion being of deflectable construction, cap means having surface-to-surface engagement with said disc-like portion, said disc-like portion being separated from said means about its periphery while in a relaxed state, said means and said disc-like portion being adapted to be moved to seal said opening and to cause a deflection of said disc-like portion whereby said opening is sealed under stress by engagement of said circumferential lip with said seal.

2. The combination defined in claim 1 wherein said disc-like portion includes a peripheral cut-out portion adjacent said means, whereby deflection of said disc-like portion provides engagement of said means with the outer periphery of said cut-out portion.

3. The combination defined in claim 1 wherein said annular seat and said circumferential surface taper inwardly and away from the opening in said hollow member.

4. The combination defined in claim 1 wherein said means for effecting deflection includes a closure cap engaged to said hollow member at said opening and outwardly of said sealing element, said closure cap including a flat bottom surface bearing against and deflecting the central portion of said element.

5. The structure defined in claim 1 wherein said element is of unitary, metallic construction.

6. A closure and fluid sealing arrangement for pressure vessels or the like, said arrangement comprising a closure cap and a rigid sealing member, said cap including a base having a flat outer surface, said sealing member being operatively connected to said cap and disposed therebelow, said member including: a circumferential lip tapering in a direction downwardly and inwardly from said cap, and a generally disc-like portion joined to the upper end or base of said lip, said disc-like portion inclining slightly from the base of said lip upwardly toward said flat outer surface of the base of said cap.

7. In combination with the closure arrangement defined in claim 6, a pressure vessel having an open end and an annular seat tapering inwardly and away from said open end, said seat being of a configuration complementary to said lip, said cap being engaged to said open end with said lip of said sealing member beng fitted in said seat, and means for applying a force to said disc-like portion to deflect it into a plane generally parallel to said flat outer surface of the base of said cap while said seat prevents any radially outward movement of said lip whereby energy will be stored in said sealing member to effect a high pressure, fluid-tight seal between said lip and said seat.

8. The combination defined in claim 7 wherein said sealing member is of integral, metallic construction.

References Cited in the file of this patent
UNITED STATES PATENTS

| | | |
|---|---|---|
| 218,411 | Wassmer | Aug. 12, 1879 |
| 440,929 | Stirling | Nov. 18, 1890 |
| 1,647,321 | Thurstensen | Nov. 1, 1927 |